United States Patent
Koga et al.

(10) Patent No.: US 11,956,092 B2
(45) Date of Patent: Apr. 9, 2024

(54) COMMUNICATION SYSTEM AND CONNECTOR

(71) Applicant: KABUSHIKI KAISHA YASKAWA DENKI, Kitakyushu (JP)

(72) Inventors: Hidetsugu Koga, Kitakyushu (JP);
Kunihiko Ogawa, Kitakyushu (JP);
Isamu Matsumura, Kitakyushu (JP);
Junya Hisamatsu, Kitakyushu (JP);
Yasuhiro Matsutani, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 272 days.

(21) Appl. No.: 17/381,194

(22) Filed: Jul. 21, 2021

(65) Prior Publication Data

US 2021/0351949 A1 Nov. 11, 2021

Related U.S. Application Data

(63) Continuation of application No. PCT/JP2019/003497, filed on Jan. 31, 2019.

(51) Int. Cl.
*H04L 12/28* (2006.01)
*G06F 1/18* (2006.01)
(Continued)

(52) U.S. Cl.
CPC .............. *H04L 12/28* (2013.01); *G06F 1/189* (2013.01); *G06F 1/26* (2013.01); *G06F 1/266* (2013.01);
(Continued)

(58) Field of Classification Search
None
See application file for complete search history.

(56) References Cited

U.S. PATENT DOCUMENTS

2008/0069151 A1* 3/2008 Satoh .................... H04L 12/417
370/503
2008/0303344 A1* 12/2008 Matsuda .................. H04B 3/54
361/104
(Continued)

FOREIGN PATENT DOCUMENTS

EP 3154151 4/2017
JP 2756212 B2 12/1993
(Continued)

OTHER PUBLICATIONS

Chinese Office Action for corresponding CN Application No. 201980088143.3, dated May 6, 2022 (w/ English machine translation).
(Continued)

*Primary Examiner* — Jay L Vogel
(74) *Attorney, Agent, or Firm* — MORI & WARD, LLP

(57) ABSTRACT

A communication system includes a master device, a connector, a superordinate trunk cable connecting the master device and the connector, a superordinate slave device connected to the connector, a subordinate slave device, and a subordinate trunk cable connecting the connector and the subordinate slave device. The connector includes a superordinate power line via which power is supplied from the master device, a power branching unit to divide the superordinate power line into a first power line connected to the superordinate slave device and a second power line connected to the subordinate slave device, a superordinate signal line via which communication data between the master device and the superordinate slave device is configured to be transmitted, and a subordinate signal line via which communication data between the superordinate slave device and the subordinate slave device is configured to be transmitted.

15 Claims, 10 Drawing Sheets

(51) Int. Cl.
*G06F 1/26* (2006.01)
*G06F 13/42* (2006.01)
*H04L 12/10* (2006.01)
*H04L 12/40* (2006.01)
*H04L 12/403* (2006.01)

(52) U.S. Cl.
CPC .......... *G06F 13/4247* (2013.01); *H04L 12/10* (2013.01); *H04L 12/2825* (2013.01); *H04L 12/40* (2013.01); *H04L 12/40045* (2013.01); *H04L 12/40169* (2013.01); *H04L 12/403* (2013.01)

(56) References Cited

U.S. PATENT DOCUMENTS

| | | | |
|---|---|---|---|
| 2009/0055676 A1* | 2/2009 | Wiebe | G06F 11/1604 713/501 |
| 2014/0029172 A1* | 1/2014 | Yoo | H02J 1/10 361/679.01 |
| 2016/0266568 A1 | 9/2016 | Kiribuchi | |
| 2018/0314219 A1 | 11/2018 | Gamroth et al. | |
| 2019/0190322 A1* | 6/2019 | Yundt | H02J 50/10 |

FOREIGN PATENT DOCUMENTS

| | | | |
|---|---|---|---|
| JP | 10-303952 | 11/1998 | |
| JP | 3730837 B2 * | 1/2006 | |
| JP | 2008-244661 | 10/2008 | |
| JP | 2013-192012 | 9/2013 | |
| JP | 2015-95221 | 5/2015 | |
| WO | WO-2019012772 A1 * | 1/2019 | ............. B60R 16/02 |

OTHER PUBLICATIONS

International Search Report for corresponding International Application No. PCT/JP2019/003497, dated Mar. 19, 2019.
Japanese Office Action for corresponding JP Application No. 2019-520168, dated May 10, 2019 (w/ English machine translation).
Heller et al., "Power-Over-Ethernet for Avionic Networks", Digital Avionics Systems Conference (DASC), Oct. 3, 2010, pp. 5.A.2-1-5.A.2-11, 29$^{th}$, IEEE, XP031816136, USA.
Extended European Search Report for corresponding EP Application No. 19913584.9-1216, dated Aug. 8, 2022.

* cited by examiner

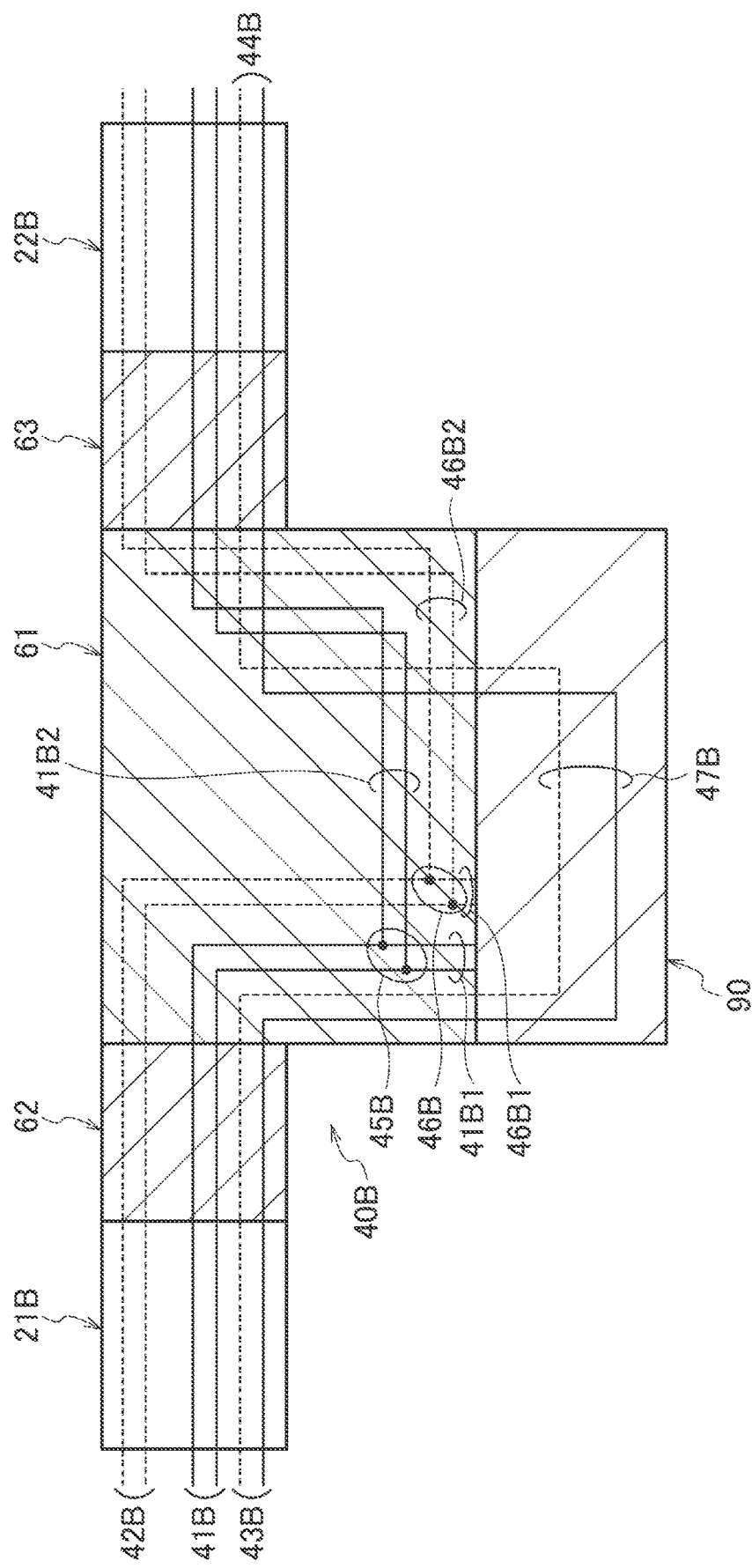

COMMUNICATION SYSTEM AND CONNECTOR

CROSS-REFERENCE TO RELATED APPLICATIONS

The present application is a continuation application of International Application No. PCT/JP2019/003497, filed Jan. 31, 2019. The contents of this application are incorporated herein by reference in their entirety.

BACKGROUND OF THE INVENTION

Field of the Invention

The present embodiment relates to a communication system and a connector.

Discussion of the Background

In the industrial multi-axis control device, motor control is performed by feeding back a signal detected by a slave device such as an encoder or a sensor to a master device. See, for example, Japanese Patent No. 2,756,212 and Japanese Unexamined Patent Application Publication No. 2015-095221.

However, in Japanese Patent No. 2,756,212 and Japanese Unexamined Patent Application Publication No. 2015-095221, since a master device is connected to a signal line and a power line on a one-to-one basis, a plurality of wires may be scattered between the master device and the plurality of slave devices, for example.

SUMMARY OF THE INVENTION

According to one aspect of the present disclosure, a communication system includes a master device, a connector, a superordinate trunk cable connecting the master device and the connector, a superordinate slave device connected to the connector, a subordinate slave device, and a subordinate trunk cable connecting the connector and the subordinate slave device. The connector includes a superordinate power line via which power is supplied from the master device, a power branching unit to divide the superordinate power line into a first power line connected to the superordinate slave device and a second power line connected to the subordinate slave device, a superordinate signal line via which communication data between the master device and the superordinate slave device is configured to be transmitted, and a subordinate signal line via which communication data between the superordinate slave device and the subordinate slave device is configured to be transmitted.

According to another aspect of the present disclosure, a communication system includes a master device, a connector, a superordinate trunk cable connecting the master device and the connector, a maintenance connector connected to the connector, a subordinate trunk cable connected to the connector, and a subordinate slave device connected to the master device via at least the subordinate trunk cable, the connector, and the maintenance connector. The connector includes a superordinate power line via which power is supplied from the master device, a power branching unit to divide the superordinate power line into a first power line connected to the maintenance connector and a second power line connected to the subordinate slave device, a superordinate signal line via which communication data between the master device and the maintenance connector is configured to be transmitted, and a subordinate signal line via which communication data between the maintenance connector and the subordinate slave device is configured to be transmitted. The maintenance connector includes a signal line connecting unit that connects the superordinate signal line and the subordinate signal line.

According to the other aspect of the present disclosure, a connector for a communication system includes a superordinate power line via which power is supplied from a master device, a power branching unit to divide the superordinate power line into a first power line connected to a superordinate slave device and a second power line connected to a subordinate slave device, a superordinate signal line via which communication data between the master device and the superordinate slave device is configured to be transmitted, and a subordinate signal line which is electrically disconnected from the superordinate signal line and via which communication data between the superordinate slave device and the subordinate slave device is configured to be transmitted.

DESCRIPTION OF THE DRAWINGS

A more complete appreciation of the present invention and many of the attendant advantages thereof will be readily obtained as the same becomes better understood by reference to the following detailed description when considered in connection with the accompanying drawings.

FIG. 10 is a diagram illustrating an example of a structure and a connection configuration of the maintenance connector 90 in the communication system 1 according to an embodiment of the present disclosure.

DESCRIPTION OF EMBODIMENTS

Hereinafter, an embodiment will be described with reference to FIGS. 1 to 3.

First Embodiment

An example of a configuration of a communication system 1 according to the present embodiment will be described with reference to FIGS. 1 to 3.

Figure 1:
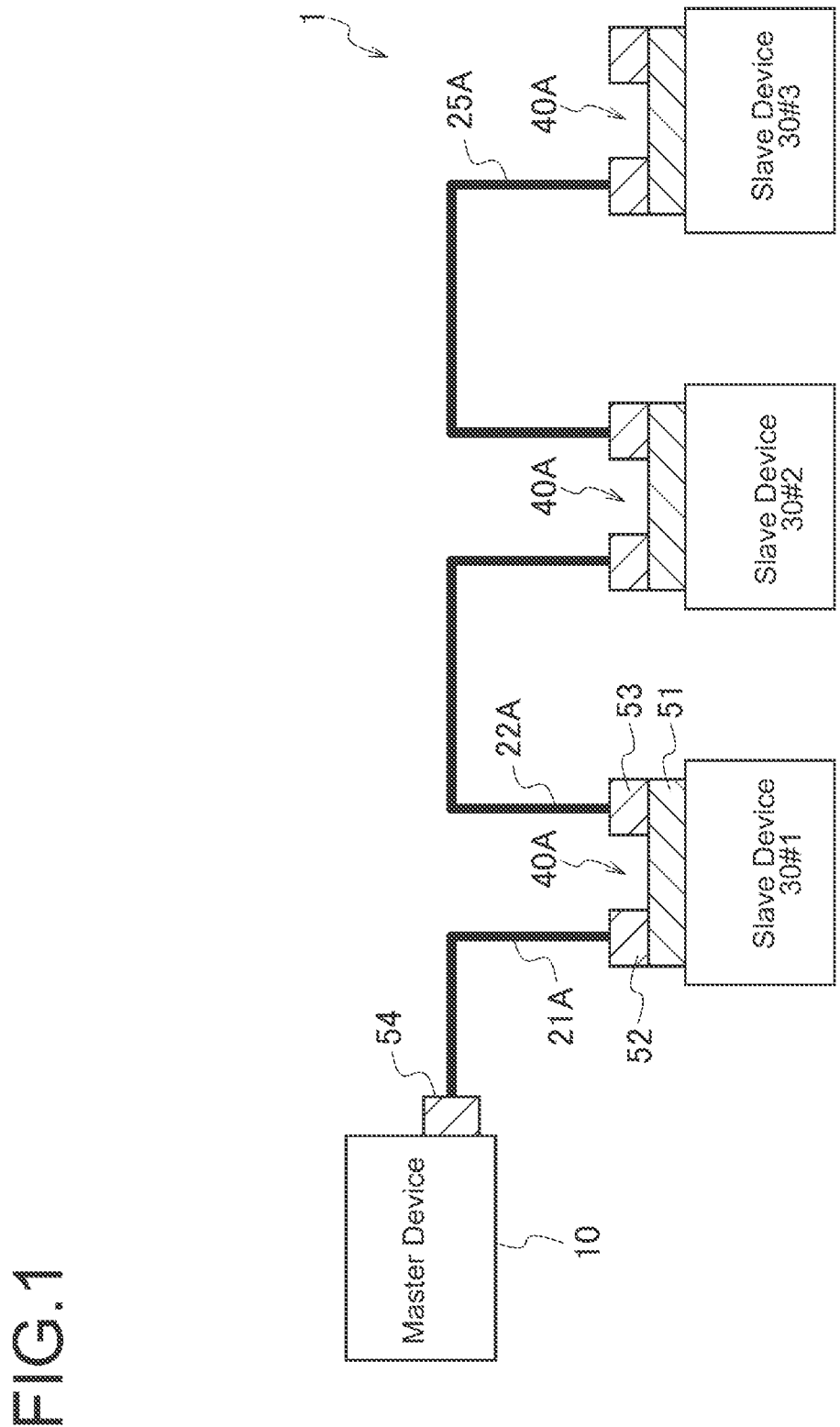
FIG. 1 is a diagram illustrating an example of an overall configuration of a communication system 1 according to an embodiment of the present disclosure.

As illustrated in FIG. 1, the communication system 1 according to the present embodiment includes a master device 10, a plurality of slave devices 30 (in the present embodiment, three slave devices 30 #1 to 30 #3), trunk cables 21A/22A/25A, and a connector 40A.

In the present embodiment, as shown in FIG. 1, the master device 10 and the plurality of slave devices 30 #1 to 30 #3 are connected by daisy chain connection. In the present embodiment, a case where the number of slave devices 30 is three is described as an example, but the present disclosure is not limited to such a case.

In the relationship between the slave device 30 #1 and the slave device 30 #2 in the present disclosure, the slave device 30 #1 is an superordinate slave device and the slave device 30 #2 is a subordinate slave device. In this case, the trunk cable 21A becomes the superordinate trunk cable 21A and the trunk cable 22A becomes the subordinate trunk cable 22A.

Similarly, in the relationship between the slave device 30 #2 and the slave device 30 #3, the slave device 30 #1 is the superordinate slave device, and the slave device 30 #2 is the subordinate slave device 30. In this case, the trunk cable 22A becomes the superordinate trunk cable 21A and the trunk cable 25A becomes the subordinate trunk cable 22A.

Hereinafter, in the present embodiment, for convenience of description, the slave device 30 #1 is referred to as a "superordinate slave device 30", and the slave device 30 #2 is referred to as a "subordinate slave device 30".

Here, the master device 10 may be the servo amplifier, and each of the slave devices 30 #1 to 30 #3 may be any one of an encoder and a sensor. Here, the encoder includes an encoder included in a servo motor and an encoder used as a type of sensor.

For example, the master device 10 may be a servo amplifier, the slave device 30 #1 may be a first encoder, the slave device 30 #2 may be a second encoder, and the slave device 30 #3 may be a sensor.

Alternatively, the master device 10 may be a first encoder, the slave device 30 #1 may be a second encoder, the slave device 30 #2 may be a third encoder, and the slave device 30 #3 may be a sensor.

The trunk cable 21A (superordinate trunk cable) is connected to the master device 10 and the connector 40A. To be more specific, the trunk cable 21A is connected to the master device 10 via the connector 54, and is connected to the slave device 30 #1 (superordinate slave device) via the connector 40A.

The slave device 30 #1 is connected to the master device 10 via at least the trunk cable 22A and the connector 40A. To be more specific, the slave device 30 #1 is connected to the master The trunk cable 22A (subordinate trunk cable) is connected to two connectors 40A. To be more specific, the trunk cable 22A is connected to the slave device 30 #1 and the slave device 30 #2 (subordinate slave device) via each of the two connectors 40A.

The slave device 30 #2 is connected to the slave device 30 #1 via at least the trunk cable 22A and the connector 40A. The slave device 30 #2 is connected to the slave device 30 #3 via at least the trunk cable 25A and the connector 40A.

Figure 2:
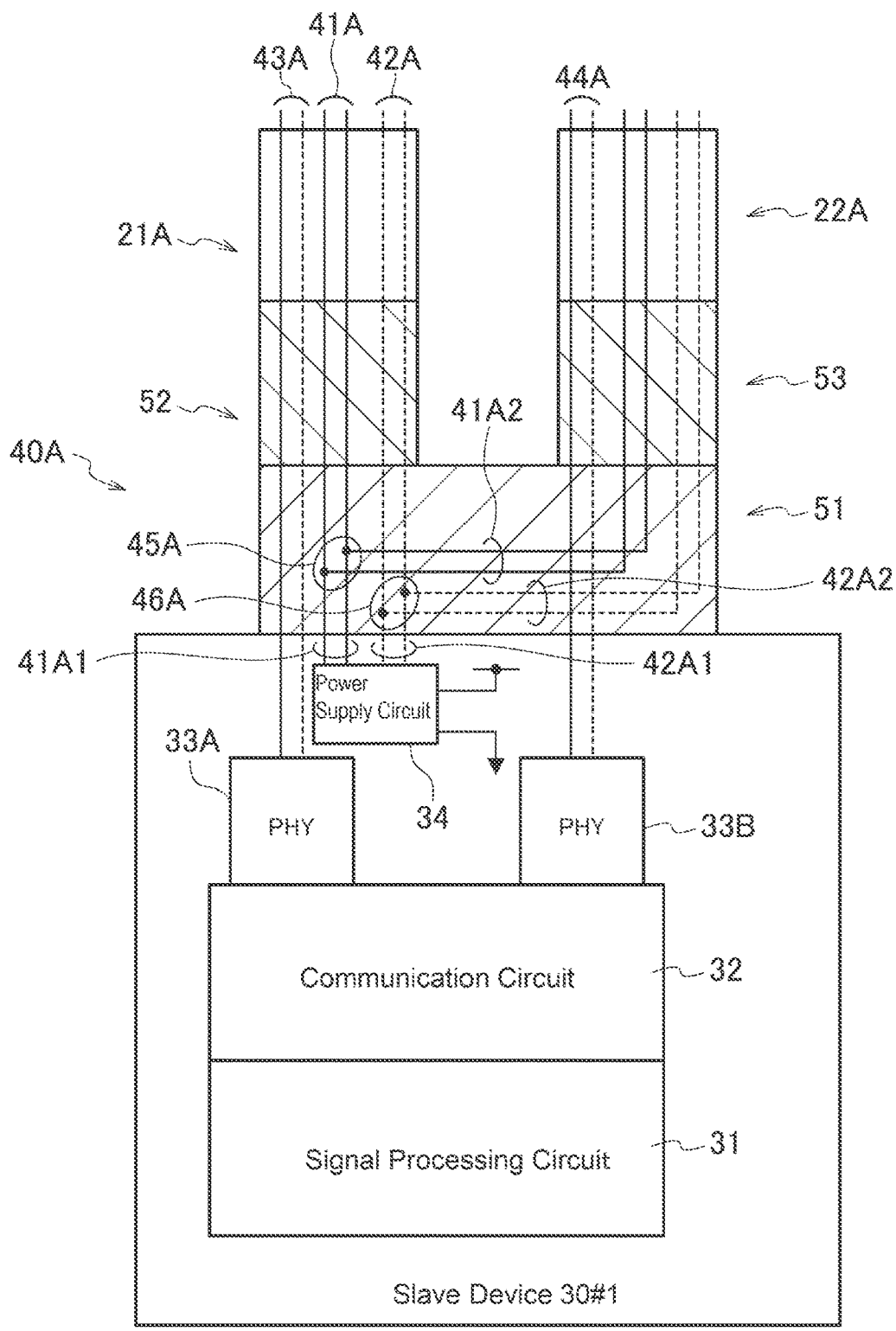
FIG. 2 is a diagram illustrating an example of a structure and a connection configuration of a connector 40A in the communication system 1 according to an embodiment of the present disclosure.

As shown in FIG. 2, the connector 40A includes a superordinate power line 41A, a superordinate signal line 43A, a subordinate signal line 44A, and a power branching unit 45A. The connector 40A may further include a standby power line 42A and a power branching unit 46A.

In the present embodiment, a case in which the superordinate power line 41A, the standby power line 42A, the superordinate signal line 43A, and the subordinate signal line 44A are configured by one pair is described as an example, but the present disclosure is not limited to such a case, and is also applied to a case in which the superordinate power line, the standby power line, the superordinate signal line, and the subordinate signal line are configured by an arbitrary number of pairs.

The superordinate power line 41A is to transmit power supplied from the master device 10 side, and the standby power line 42A is to transmit power transmitted from a power supply unit 71 (see FIGS. 7 and 8) described later.

The superordinate signal line 43A is used to transmit communication between the master device 10 and the slave device 30 #1, and the subordinate signal line 44A is used to transmit communication between the slave device 30 #1 and the slave device 30 #2. The superordinate signal line 43A and the subordinate signal line 44A are electrically disconnected from each other in the connector 40A.

The power branching unit 45A branches the superordinate power line 41A into a first power line 41A1 directed toward the slave device 30 #1 and a second power line 41A2 directed toward the slave device 30 #2.

The power branching unit 46A branches the standby power line 42A into a first standby power line 42A1 directed toward the slave device 30 #1 and a second standby power line 42A2 directed toward the slave device 30 #2.

As shown in FIG. 2, the connector 40A includes a first connecting unit 51, a second connecting unit 52, and a third connecting unit 53.

The first connecting unit 51 is connected to the slave device 30 #1 (superordinate slave device), the second connecting unit 52 is connected to the first connecting unit 51 and the trunk cable 21A, and the third connecting unit 53 is connected to the first connecting unit 51 and the trunk cable 22A.

Figure 3:
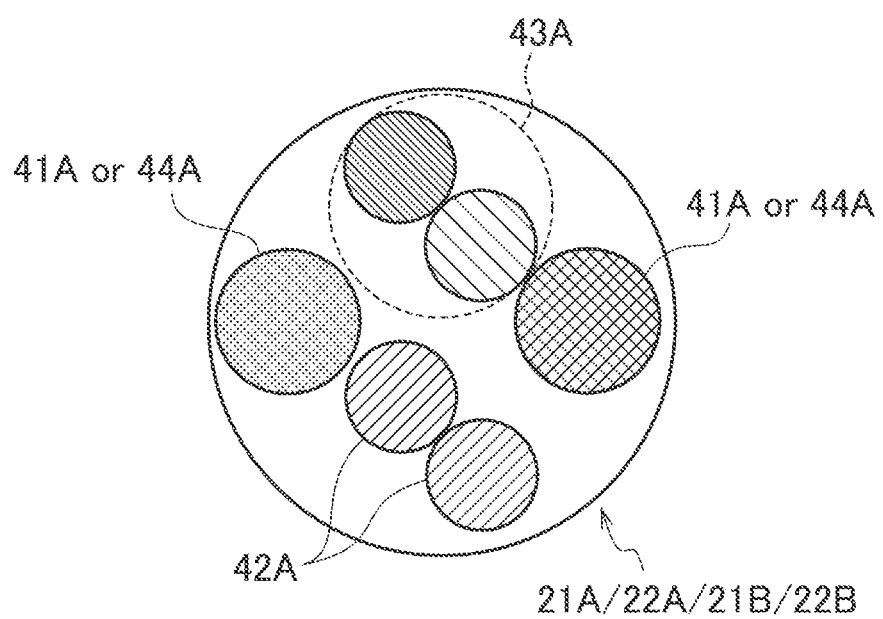
FIG. 3 is a diagram illustrating an example of a structure of a cable in the communication system 1 according to an embodiment of the present disclosure.

As shown in FIGS. 2 and 3, the trunk cable 21A includes a superordinate power line 41A and a superordinate signal line 43A. The trunk cable 21A may further include a standby power line 42A.

As shown in FIGS. 2 and 3, the trunk cable 22A includes a second power line 41A2 and a subordinate signal line 44A. The trunk cable 22A may further include a standby power line 42A (second standby power line 42A2).

The first connecting unit 51 includes a power branching unit 45A, a superordinate power line 41A (a first power line 41A1 and a second power line 41A2), a superordinate signal line 43A, and a subordinate signal line 44A. The first connecting unit 51 may further include a power branching unit 46A and a standby power line 42A (a first standby power line 42A1 and a second standby power line 42A2).

The slave device 30 #1 includes a signal processing circuit 31, a communication circuit 32, a PHY33A, a PHY33B, and a power supply circuit 34.

The PHY33A transmits and receives electrical signals via the superordinate signal line 43A, and the PHY33B transmits and receives electrical signals via the superordinate signal line 43A.

The communication circuit 32 converts an electric signal received from the PHY33A/PHY33B into a communication signal and transmits the communication signal to the signal processing circuit 31, and converts a communication signal received from the signal processing circuit 31 into an electric signal and transmits the electric signal to the PHY33A/PHY33B.

The signal processing circuit 31 performs signal processing on the communication signal received from the communication circuit 32. The power supply circuit 34 supplies power via the superordinate power line 41A and the standby power line 42A.

Second Embodiment

An example of the configuration of the communication system 1 according to the present embodiment will be described with reference to FIGS. 4 to 6, focusing on differences from the configuration of the communication system 1 according to the first embodiment described above.

Figure 4:
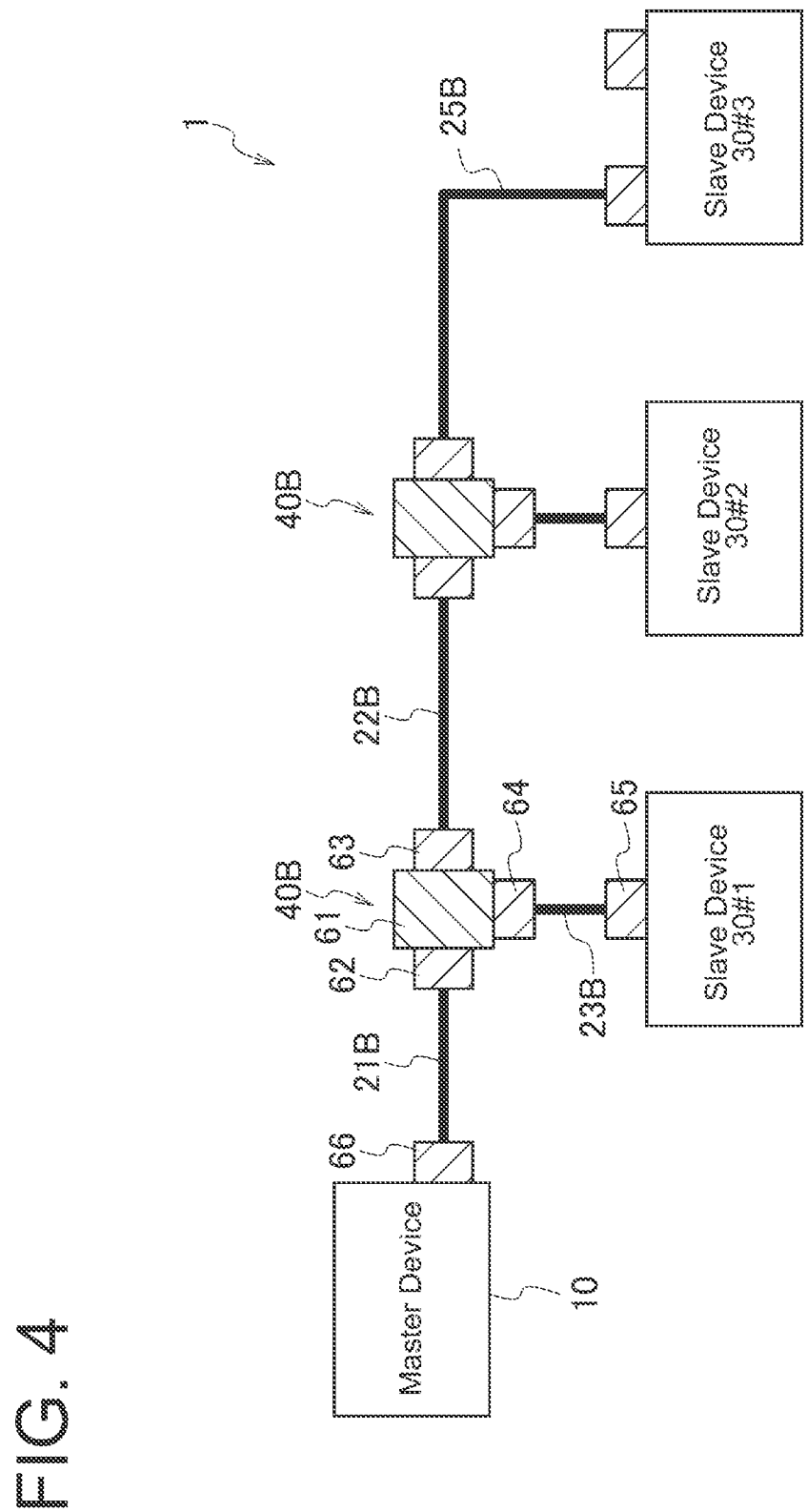
FIG. 4 is a diagram illustrating an example of an overall configuration of a communication system 1 according to an embodiment of the present disclosure.

As illustrated in FIG. 4, the communication system 1 according to the present embodiment includes a master device 10, a plurality of slave devices 30 (three slave devices 30 #1 to 30 #3 in the present embodiment), trunk cables 21B/22B/25B, branch cables 23B, and connectors 40B/65.

In the present embodiment, as shown in FIG. 4, the master device 10 and the plurality of slave devices 30 #1 to 30 #3 are connected by T-branch connection. The T-shaped branch connection is used when the slave device 30 is separated from the trunk cables 21B/22B/25B. In the present embodiment, a case where the number of slave devices 30 is three is described as an example, but the present disclosure is not limited to such a case.

Figure 5:
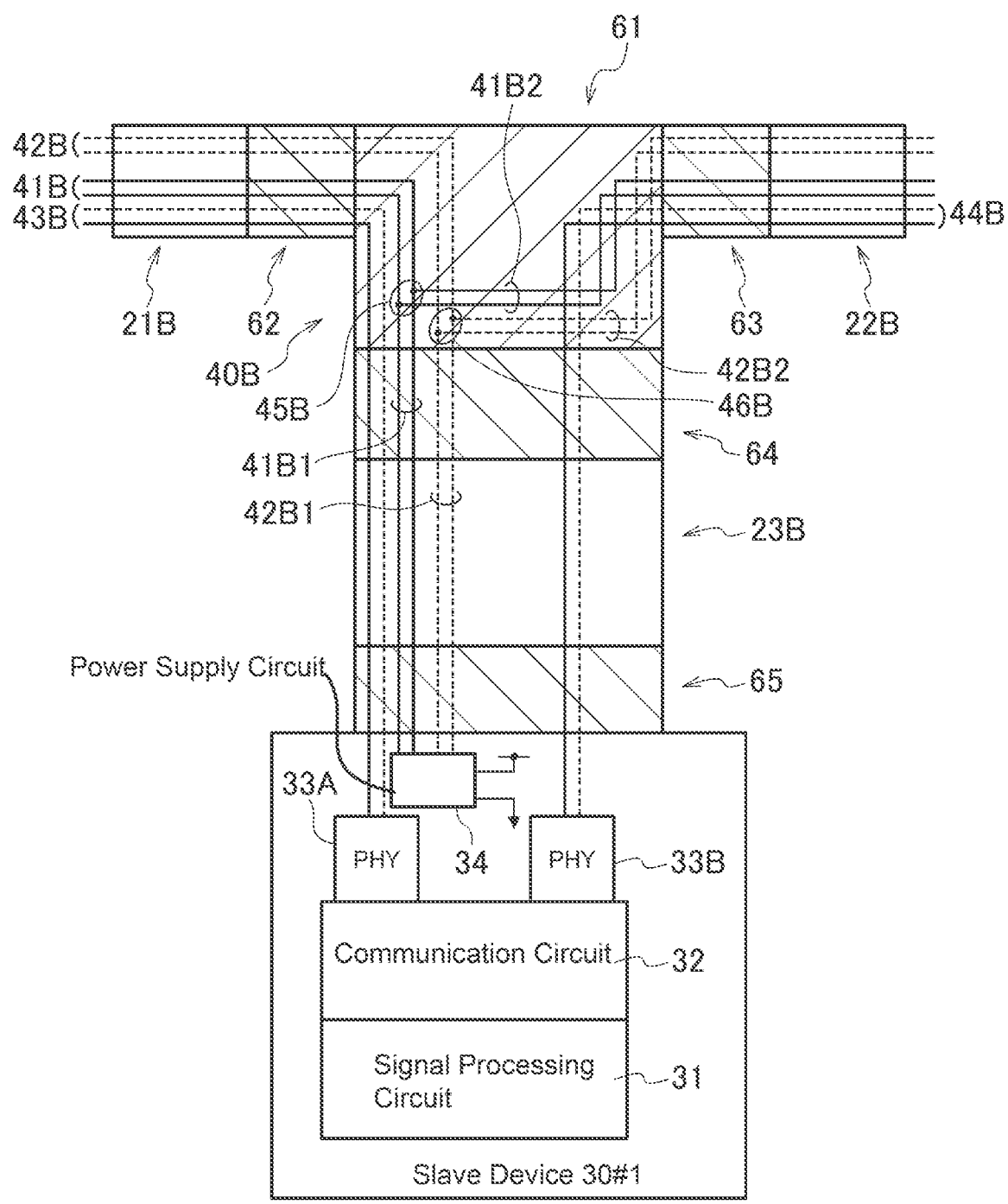
FIG. 5 is a diagram illustrating an example of a structure and a connection configuration of a connector 40B in the communication system 1 according to an embodiment of the present disclosure.

As shown in FIG. 5, the connector 40B includes a first connecting unit 61, a second connecting unit 62, a third connecting unit 63, and a fourth connecting unit 64.

The second connecting unit 62 is connected to the first connecting unit 61 and the trunk cable 21B, the third connecting unit 63 is connected to the first connecting unit 61 and the trunk cable 22B, and the fourth connecting unit 64 is connected to the first connecting unit 61 and the branch cable 23B extending toward the slave device 30 #1.

As shown in FIGS. 3 and 5, the trunk cable 21B includes an superordinate power line 41B and an superordinate signal line 43B. The trunk cable 21B may further include a standby power line 42B.

As shown in FIGS. 3 and 5, the trunk cable 22B includes a second power line 41B2 and a subordinate signal line 44B. The trunk cable 22B may further include a standby power line 42A (second standby power line 42B2).

Figure 6:
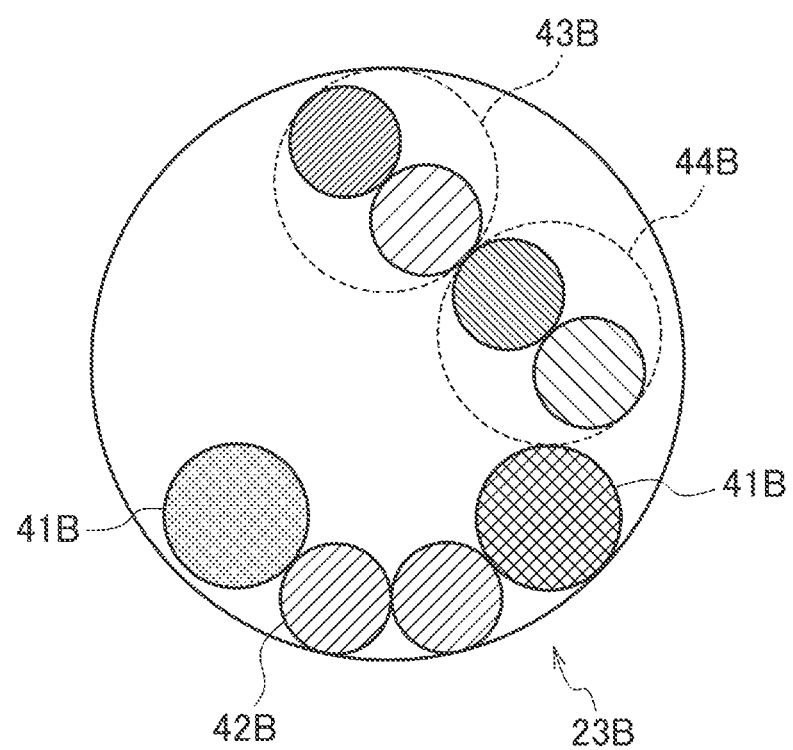
FIG. 6 is a diagram illustrating an example of a structure of a cable in the communication system 1 according to an embodiment of the present disclosure.

As shown in FIGS. 5 and 6, the branch cable 23B includes a superordinate power line 41B (first power line 41B1), a superordinate signal line 43B, and a subordinate signal line 44B. The branch cable 23B may further include a standby power line 42A (second standby power line 42B2).

The first connecting unit 61 includes a power branching unit 45B, a superordinate power line 41B (a first power line 41B1 and a second power line 41B2), a superordinate signal line 43B, and a subordinate signal line 44B. The first connecting unit 61 may further include a power branching unit 46B and a standby power line 42B (a first standby power line 42B1 and a second standby power line 42B2).

External Power Supply Configuration

Hereinafter, the configuration of the external power supply in the communication system 1 according to the present embodiment will be described with reference to FIGS. 7 and 8.

Figure 7:
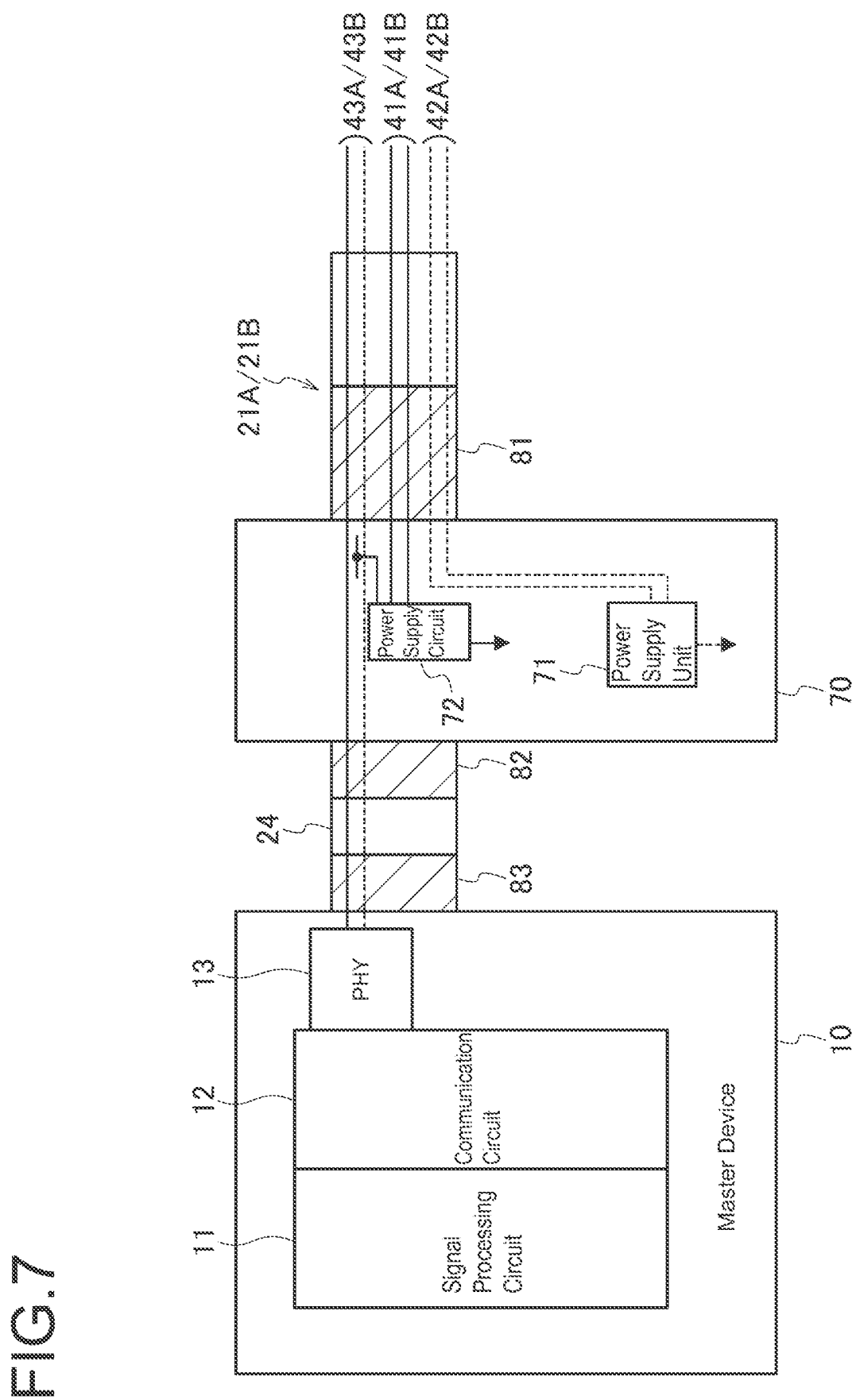
FIG. 7 is a diagram illustrating an example of an external power supply configuration in the communication system 1 according to an embodiment of the present disclosure.
Figure 8:
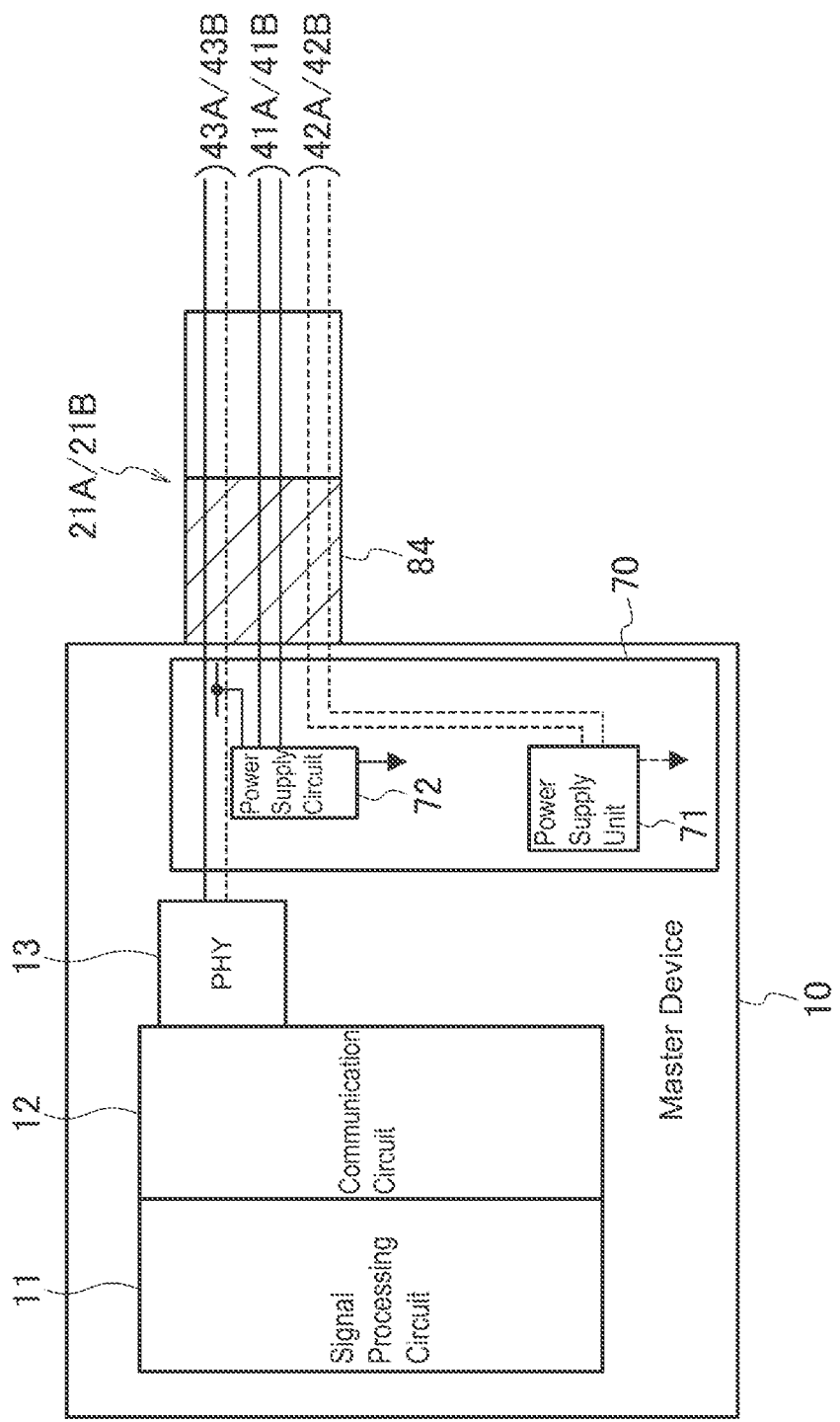
FIG. 8 is a diagram illustrating an example of an external power supply configuration in the communication system 1 according to an embodiment of the present disclosure.

As shown in FIGS. 7 and 8, the communication system 1 according to the present embodiment further includes a power source 70 disposed between the master device 10 and the connector 40A/40B.

The power source 70 includes a power supply circuit 72 and a power supply unit 71. The power supply circuit 72 supplies power via the superordinate power lines 41A/41B. The power supply unit 71 supplies power via the standby power lines 42A/42B as a standby power supply when the power supply capacity of the power supply circuit 72 is insufficient. For example, the power supply unit 71 may be a battery.

In addition, the power source 70 includes a standby power line 81 that transmits power transmitted from the power supply unit 71, and superordinate signal lines 21A/21B.

As shown in FIG. 7, the power source 70 may be provided outside the master device 10 and connected to the master device 10 via the connector 82, the cable 24, and the connector 83.

Alternatively, as shown in FIG. 7, the power source 70 may be provided inside the master device 10.

The master device 10 includes a signal processing circuit 11, a communication circuit 12, and a PHY13. PHY13 transmits and receives electrical signals via superordinate signal lines 43A/43B. The communication circuit 12 converts an electric signal received from the PHY13 into a communication signal and transmits the communication signal to the signal processing circuit 11, and converts a communication signal received from the signal processing circuit 11 into an electric signal and transmits the electric signal to the PHY13. The signal processing circuit 11 performs signal processing on the communication signal received from the communication circuit 12.

Maintenance Connector 90

Figure 9:
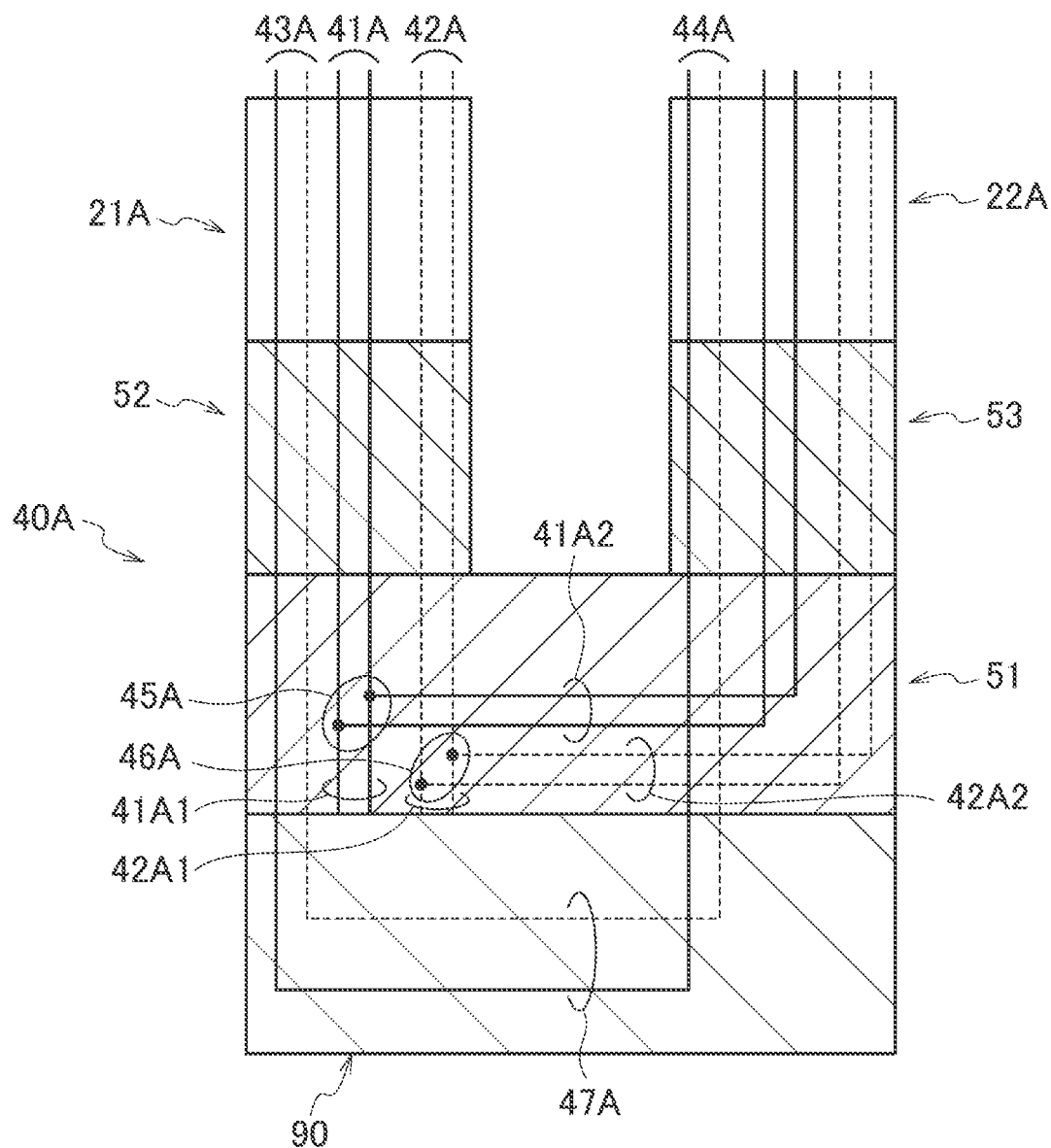
FIG. 9 is a diagram illustrating an example of a structure and a connection configuration of the maintenance connector 90 in the communication system 1 according to an embodiment of the present disclosure.

Hereinafter, the maintenance connector 90 used in the communication system 1 according to the present embodiment will be described with reference to FIGS. 9 and 10. FIG. 9 shows an example of the structure and connection configuration of the maintenance connector 90 used in the communication system 1 according to the first embodiment, and FIG. 10 shows an example of the structure and connection configuration of the maintenance connector 90 used in the communication system 1 according to the second embodiment.

As shown in FIGS. 9 and 10, the maintenance connector 90 is connected to the first connecting unit 51 of the connector 40A or the first connecting unit 61 of the connector 40B. Here, the maintenance connector 90 has signal line connecting units 47A/47B that connect the superordinate signal lines 43A/43B and the subordinate signal lines 44A/44B.

Effects of the Present Embodiment

As described above, the communication system 1 according to the present embodiment includes the master device 10, the trunk cables 21A/21B, the connectors 40A/40B, the slave device 30 #1, the trunk cables 22A/22B, and the slave device 30 #2. The connectors 40A/40B include the superordinate power lines 41A/41B, the power branching units 45A/45B, the superordinate signal line 43A, and the subordinate signal line 44A.

According to such a configuration, since the power to the subordinate slave device (the slave device 30 #2 or the slave device 30 #3) is not electrically disconnected even in a case that the superordinate slave device 30 (the slave device 30 #1) is broken and disconnected, the recovery work of the failed superordinate slave device 30 (the slave device 30 #1) can be performed in a state in which the power is supplied to the subordinate slave device.

Further, in the communication system 1 according to the present embodiment, the connectors 40A/40B may include the first connecting unit 51, the second connecting unit 52, and the third connecting unit 53. The trunk cable 21A may include the superordinate power line 41A and the superordinate signal line 43A. The trunk cable 22A may include the second power line 41A2 and the lower signal line 44A. The first connecting unit 51 may include the power 45A. According to such a configuration, it is possible to realize daisy chain connection that is capable of giving a degree of freedom to the configuration of the slave device 30 to be connected by using a general-purpose wiring method.

In the communication system 1 according to the present embodiment, the connectors 40A/40B may include the first connecting unit 61, the second connecting unit 62, the third connecting unit 63, and the fourth connecting unit 64, the trunk cable 21B may include the superordinate power line 41B and the superordinate signal line 43B, the trunk cable 22B may include the second power line 45B1 and the subordinate signal line 44B, the branch cable 23B may include the first power line 45B1, the superordinate signal line 43B, and the subordinate signal line 44B, and the first connecting unit 61 may include the power branching unit 45B. According to such a configuration, it is possible to realize a T-shaped branch connection that is capable of giving a degree of freedom to the configuration of the slave device 30 to be connected by using a general-purpose wiring method.

The communication system 1 according to the present embodiment may further include the power source 70, and the power source 70 may further include the power supply unit 71, the standby power lines 42A/42B, and the superordinate signal lines 43A/43B.

According to such a configuration, even when the power supply capacity of the master device 10 is insufficient or a plurality of different power supplies are required, power (standby power) can be supplied from the power source 70 as well. Therefore, the slave device 30 to be connected can have versatility.

In the communication system 1 according to the present embodiment, the connectors 40A/40B may further include power branching units 46A/46B. According to such a configuration, when the superordinate slave device 30 (slave device 30 #1) is broken and disconnected, not only the power to the subordinate slave device 30 (slave device 30 #2) but also the standby power is not electrically disconnected, and therefore the recovery work of the failed superordinate slave device (the slave device 30 #1) can be performed in a state in which the power and standby power is supplied to the subordinate slave device (slave device 30 #2).

In the communication system 1 according to the present embodiment, the master device 10 may be the servo amplifier, and each of the slave devices 30 #1 to 30 #3 may be any one of an encoder and a sensor. According to this configuration, in a machine such as a robot, the movable range of the machine can be expanded by saving wiring. Since power can also be supplied to the servo motor and the encoder as the subordinate slave device 30 when the servo motor and the encoder as the superordinate slave device 30 are replaced, it becomes unnecessary to correct the positional deviation at the time of restoration, thereby improving the usability of the entire robot and shortening the restoration work.

Further, in the communication system 1 according to the present embodiment, the connectors 40A/40B include superordinate power lines 41A/41B, power branching units 45A/45B, superordinate signal lines 43A/43B for transmitting communication data between the master device 10 side and the maintenance connector 90 side, and subordinate signal lines 44A/44B for transmitting communication data between the maintenance connector 90 side and the slave device 30 #2 side.

The maintenance connector 90 includes signal line connecting units 47A/47B to connect the superordinate signal lines 42A/43B and the subordinate signal lines 44A/44B. According to such a configuration, even in a state where the specific slave device 30 #1 is disconnected, it is possible to continue communication between the master device 10 and the other slave devices 30 #2/30 #3.

According to the communication system 1 and the connector 90 in the present disclosure, it is possible to reduce the size of the equipment in the industrial multi-axis control device and improve maintainability.

Obviously, numerous modifications and variations of the present invention are possible in light of the above teachings. It is therefore to be understood that within the scope of the appended claims, the invention may be practiced otherwise than as specifically described herein.

What is claimed is:

1. A communication system comprising:
   a master device;
   a connector;
   a superordinate trunk cable connecting the master device and the connector;
   a superordinate slave device connected to the connector;
   a subordinate slave device;
   a subordinate trunk cable connecting the connector and the subordinate slave device; and
   the connector comprising:
      a superordinate power line via which power is supplied from the master device;
      a power branching unit to divide the superordinate power line into a first power line connected to the superordinate slave device and a second power line connected to the subordinate slave device;
      a superordinate signal line via which communication data between the master device and the superordinate slave device is configured to be transmitted;
      a subordinate signal line via which communication data between the superordinate slave device and the subordinate slave device is configured to be transmitted; and
      a standby power line via which power is supplied from the master device, the standby power line being separate from the superordinate power line,
   wherein the superordinate signal line and the subordinate signal line are electrically disconnected from each other in the connector.

2. The communication system according to claim 1, wherein the connector comprises
   a first connecting unit connected to the superordinate slave device,
   a second connecting unit connected to the first connecting unit and the superordinate trunk cable, and a third connecting unit connected to the first connecting unit and the subordinate trunk cable,
wherein the superordinate trunk cable comprises
the superordinate power line, and
the superordinate signal line,
wherein the subordinate trunk cable comprises
the second power line, and
the subordinate signal line, and
wherein the first connection portion comprises the power branching unit.

3. The communication system according to claim 1,
wherein the connector comprises
a first connecting unit,
a second connecting unit connected to the first connecting unit and the superordinate trunk cable,
a third connecting unit connected to the first connecting unit and the subordinate trunk cable, and
a fourth connecting unit connected to the first connecting unit and a branch cable which is connected to the superordinate slave device,
wherein the superordinate trunk cable comprises
the superordinate power line, and
the superordinate signal line,
wherein the subordinate trunk cable comprises
the second power line, and
the subordinate signal line,
wherein the branch cable comprises
the first power line,
the superordinate signal line, and
the subordinate signal line, and
wherein the first connecting unit comprises the power branching unit.

4. The communication system according to claim 1, further comprising:
a power source disposed between the master device and the connector and comprising:
a power supply unit;
the standby power line via which power transmitted from the power supply unit is transmitted; and
the superordinate signal line.

5. The communication system according to claim 4, wherein
the connector further comprises an additional power branching unit to divide the standby power line into a first standby power line connected to the superordinate slave device and a second standby power line connected to the subordinate slave device.

6. The communication system according to claim 1, wherein
the master device comprises a servo amplifier, and
each of the superordinate slave device and the subordinate slave device comprises an encoder or a sensor.

7. The communication system according to claim 1, wherein
the connector further comprises an additional power branching unit to divide the standby power line into a first standby power line connected to the superordinate slave device and a second standby power line connected to the subordinate slave device.

8. The communication system according to claim 1, wherein
the superordinate power line and the superordinate signal line are separate lines.

9. A communication system comprising:
a master device;
a connector;
a superordinate trunk cable connecting the master device and the connector;
a maintenance connector connected to the connector;
a subordinate trunk cable connected to the connector;
a subordinate slave device connected to the master device via at least the subordinate trunk cable, the connector, and the maintenance connector;
the connector comprising:
a superordinate power line via which power is supplied from the master device;
a power branching unit to divide the superordinate power line into a first power line and a second power line connected to the subordinate slave device;
a superordinate signal line via which communication data between the master device and the maintenance connector is configured to be transmitted; and
a subordinate signal line via which communication data between the maintenance connector and the subordinate slave device is configured to be transmitted; and
the maintenance connector including a signal line connecting unit that connects the superordinate signal line and the subordinate signal line, and without a branched signal line that connects to another slave device,
wherein the superordinate signal line and the subordinate signal line are electrically disconnected from each other in the connector.

10. The communication system according to claim 9, wherein
the connector further comprises a standby power line via which power is supplied from the master device, the standby power line being separate from the superordinate power line.

11. The communication system according to claim 10, wherein
the connector further comprises an additional power branching unit to divide the standby power line into a first standby power line and a second standby power line connected to the subordinate slave device.

12. The communication system according to claim 9, wherein
the superordinate power line and the superordinate signal line are separate lines.

13. A connector comprising:
a superordinate power line via which power is supplied from a master device;
a power branching unit to divide the superordinate power line into a first power line connected to a superordinate slave device and a second power line connected to a subordinate slave device;
a superordinate signal line via which communication data between the master device and the superordinate slave device is configured to be transmitted;
a subordinate signal line which is electrically disconnected from the superordinate signal line and via which communication data between the superordinate slave device and the subordinate slave device is configured to be transmitted; and
a standby power line via which power is supplied from the master device, the standby power line being separate from the superordinate power line,
wherein the superordinate signal line and the subordinate signal line are electrically disconnected from each other in the connector.

14. The connector according to claim 13, further comprising:
    an additional power branching unit to divide the standby power line into a first standby power line connected to the superordinate slave device and a second standby power line connected to the subordinate slave device.

15. The connector according to claim 13, wherein
the superordinate power line and the superordinate signal line are separate lines.

\* \* \* \* \*